United States Patent
Park et al.

(10) Patent No.: US 12,050,728 B2
(45) Date of Patent: Jul. 30, 2024

(54) REAL-TIME IMMERSIVE CONTENT PROVIDING SYSTEM, AND HAPTIC EFFECT TRANSMISSION METHOD THEREOF

(71) Applicant: KOREA ELECTRONICS TECHNOLOGY INSTITUTE, Seongnam-si (KR)

(72) Inventors: Woo Chool Park, Incheon (KR); Jun Hwan Jang, Goyang-si (KR); Yong Hwa Kim, Seoul (KR); Jin Wook Yang, Uijeongbu-si (KR); Sang Pil Yoon, Seoul (KR); Hyun Wook Kim, Goyang-si (KR); Eun Kyung Cho, Gyeonggi-do (KR); Min Su Choi, Seoul (KR); Jun Suk Lee, Seoul (KR); Jae Young Yang, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 71 days.

(21) Appl. No.: 17/595,491

(22) PCT Filed: Sep. 18, 2019

(86) PCT No.: PCT/KR2019/012011
§ 371 (c)(1),
(2) Date: Nov. 17, 2021

(87) PCT Pub. No.: WO2020/235749
PCT Pub. Date: Nov. 26, 2020

(65) Prior Publication Data
US 2022/0214749 A1    Jul. 7, 2022

(30) Foreign Application Priority Data
May 17, 2019  (KR) .......................... 10-2019-0058126

(51) Int. Cl.
| | | |
|---|---|---|
| G06F 3/01 | (2006.01) | |
| A63F 13/285 | (2014.01) | |
| G06F 3/0346 | (2013.01) | |

(52) U.S. Cl.
CPC ............ *G06F 3/016* (2013.01); *A63F 13/285* (2014.09); *G06F 3/011* (2013.01); *G06F 3/0346* (2013.01)

(58) Field of Classification Search
CPC .... G06F 3/016; G06F 3/041; G06F 2203/014; G06F 3/011; G06F 3/0346; G08B 6/00;
(Continued)

(56) References Cited

U.S. PATENT DOCUMENTS

| | | | |
|---|---|---|---|
| 10,075,251 B2 | 9/2018 | Heubel et al. | |
| 10,200,434 B1 * | 2/2019 | Wells | ................. H04N 21/4385 |

(Continued)

FOREIGN PATENT DOCUMENTS

| | | |
|---|---|---|
| KR | 10-0761022 B1 | 9/2007 |
| KR | 10-2011-0040128 A | 4/2011 |

(Continued)

OTHER PUBLICATIONS

International Search Report mailed Feb. 14, 2020 in International Application No. PCT/KR2019/012011, in 4 pages.

*Primary Examiner* — William Lu
(74) *Attorney, Agent, or Firm* — Knobbe, Martens, Olson & Bear, LLP

(57) ABSTRACT

A haptic effect transmission method for providing real-time immersive content according to the present invention includes executing participatory content in which one or more users participate, collecting motion information of the users participating in the participatory content through a haptic device, multiplexing the motion information with video and audio files of the participatory content to obtain a (Continued)

multiplexed file, and demultiplexing the multiplexed file and providing the demultiplexed file to a display device and a haptic device of a client terminal.

4 Claims, 5 Drawing Sheets

(58) Field of Classification Search
CPC ........... H04N 21/235; H04N 21/23614; H04N 21/4126; H04N 21/4131; H04N 21/435; H04N 21/23439; H04N 21/236; H04N 21/2368; H04N 21/8545; A63F 13/285; A63F 13/355; G06Q 50/10
See application file for complete search history.

(56) References Cited

U.S. PATENT DOCUMENTS

| | | | | |
|---|---|---|---|---|
| 10,320,501 | B2* | 6/2019 | Heubel | A63F 13/285 |
| 2002/0035725 | A1* | 3/2002 | Ando | H04N 21/236 |
| | | | | 375/E7.009 |
| 2003/0206586 | A1* | 11/2003 | Ando | H04N 21/835 |
| | | | | 375/E7.009 |
| 2009/0096632 | A1* | 4/2009 | Ullrich | H04N 21/81 |
| | | | | 340/407.1 |
| 2012/0173050 | A1* | 7/2012 | Bernstein | B62D 61/00 |
| | | | | 701/2 |
| 2014/0300454 | A1* | 10/2014 | Lacroix | G08B 6/00 |
| | | | | 340/407.2 |
| 2015/0046828 | A1* | 2/2015 | Desai | H04L 67/535 |
| | | | | 715/739 |
| 2015/0070152 | A1* | 3/2015 | Rank | H04N 21/23614 |
| | | | | 340/407.1 |
| 2015/0077234 | A1* | 3/2015 | Fullam | G04G 17/083 |
| | | | | 340/407.1 |
| 2016/0166929 | A1* | 6/2016 | Rihn | A63F 13/428 |
| | | | | 463/37 |
| 2016/0231816 | A1* | 8/2016 | Rank | H04N 21/235 |
| 2017/0098350 | A1* | 4/2017 | Ebeling | G08B 6/00 |
| 2017/0113135 | A1* | 4/2017 | Marr | H04L 65/762 |
| 2017/0113143 | A1* | 4/2017 | Marr | A63F 13/355 |
| 2018/0227063 | A1* | 8/2018 | Heubel | G08B 6/00 |
| 2018/0284894 | A1* | 10/2018 | Raut | G06F 3/167 |
| 2018/0301140 | A1* | 10/2018 | Turcott | G06N 3/044 |
| 2018/0336929 | A1* | 11/2018 | Filippini | H04N 21/4131 |
| 2018/0343075 | A1* | 11/2018 | Heubel | A63F 13/285 |
| 2019/0107891 | A1* | 4/2019 | Rank | H04N 21/23614 |
| 2019/0235640 | A1* | 8/2019 | Chin | G06F 3/01 |
| 2020/0152234 | A1* | 5/2020 | Sharma | H04N 21/23439 |
| 2020/0368616 | A1* | 11/2020 | Delamont | H04N 13/239 |
| 2022/0044480 | A1* | 2/2022 | Zavesky | G06T 15/20 |

FOREIGN PATENT DOCUMENTS

| | | |
|---|---|---|
| KR | 10-2015-0116241 A | 10/2015 |
| KR | 10-2016-0011745 A | 2/2016 |
| KR | 10-1773464 B1 | 8/2017 |
| KR | 10-2018-0092268 A | 8/2018 |

\* cited by examiner

REAL-TIME IMMERSIVE CONTENT PROVIDING SYSTEM, AND HAPTIC EFFECT TRANSMISSION METHOD THEREOF

TECHNICAL FIELD

The present invention relates to a system for providing immersive content in real time and a method of transmitting a haptic effect using the same.

BACKGROUND ART

Haptic technology refers to a technology for delivering more realistic information, such as virtual computer experiences, to users by allowing users to feel vibration, movement, force, and the like while manipulating various input devices of game consoles or computers, such as joysticks, mice, keyboards, and touch screens.

In the existing computer technology, humans and computers exchange information using visual and auditory information. However, as users want more specific and realistic information, haptic technology for delivering tactile information has been developed to satisfy this demand.

Recently, haptic technology is used as a term referring to computer tactile technology. Along with the development of information communication terminals such as laptops, smartphones, and tablet PCs or electronic devices such as video game consoles and remote controllers, haptic technology that enables users to feel tactile sensation using these devices in addition to visual or auditory information is attracting attention. In particular, recently, along with the wide use of smartphones, devices capable of reproducing haptic effects in smartphones and software for controlling the devices have been provided, thus making it possible to provide various haptic effects to users while they hold smartphones in their hands.

In addition, haptic technology is attempting to expand to a function of delivering a vibration effect associated with sound to a user who is listening to the sound while holding a smartphone in his or her hand in connection with the reproduction of a sound source beyond a function of delivering effects related to visual information or auditory information to users as vibrations when they play games, etc.

Meanwhile, along with the recent activation of e-sports, there have been a large number of players and viewers, and the viewers can indirectly experience the plays of famous players by watching them at home.

However, in the case of the conventional technology, viewers encounter the plays of the players only through video and audio and thus the level of immersion is low. Furthermore, in the case of multimedia content such as movies, there is a limitation in feeling realistic sensation because there is no technology capable of providing tactile sensation in addition to video and audio, and thus the level of immersion cannot exceed certain limits.

DISCLOSURE

Technical Problem

In order to solve the above problem, the present invention provides a real-time immersive content provision system capable of providing data on haptic content produced for a viewer's immersion in participatory content along with video and audio in real time, and a haptic effect transmission method thereof.

However, technical objects to be achieved by the present embodiments are not limited to the above-mentioned technical objects, and other technical objects may be present.

Technical Solution

To achieve the above-described technical objectives, a haptic effect transmission method for providing real-time immersive content according to a first aspect of the present invention includes executing participatory content in which one or more users participate, collecting motion information of the users participating in the participatory content through a haptic device, multiplexing the motion information with video and audio files of the participatory content to obtain a multiplexed file, and demultiplexing the multiplexed file and providing the demultiplexed file to a display device and a haptic device of a client terminal The multiplexed file may be provided to the client terminal after synchronization and encoding, and the motion information may be generated based on movements, speeds, shaking, action intensity, and emotional expressions of objects and people of the participatory content.

The users may be a plurality of users, and the client terminal may receive haptic information multiplexed with video and audio files corresponding to a user selected among the plurality of users from the client terminal.

A real-time immersive content provision system capable of transmitting a haptic effect according to a second aspect of the present invention includes one or more user terminals each including a display device on which participatory content is executed and a haptic device which collects a user's motion information, a server configured to multiplex the motion information with video and audio files of the participatory content received from the one or more user terminals to obtain a multiplexed file; and a client terminal configured to receive and demultiplex the multiplexed file and configured to output video and audio to the display device and output the motion information to the haptic device.

The multiplexed file may be provided to the client terminal after synchronization and encoding, and the motion information may be generated based on movements, speeds, shaking, action intensity, and emotional expressions of objects and people of the participatory content.

The users may be a plurality of users, and the client terminal may receive haptic information multiplexed with video and audio files corresponding to a user selected among the plurality of users from the client terminal.

Advantageous Effects

In the case of using the existing media content, only a video and audio-dependent experience can be provided, but according to one of the above-described problem solving means of the present invention, it is possible to provide haptic data as well as video and audio to viewers in real time.

In particular, in the case of having a haptic device, a tactile sensation transferred to a subject can be provided in a real screen along the video and audio, and thus it is possible to provide a greater sense of immersion to viewers.

In addition, by partially utilizing the existing media content processing method, advantageously, the present invention can reduce the change in system and the consumption of resources and also is applicable to high-quality content as well as low-quality content.

BEST MODES

Figure 1:
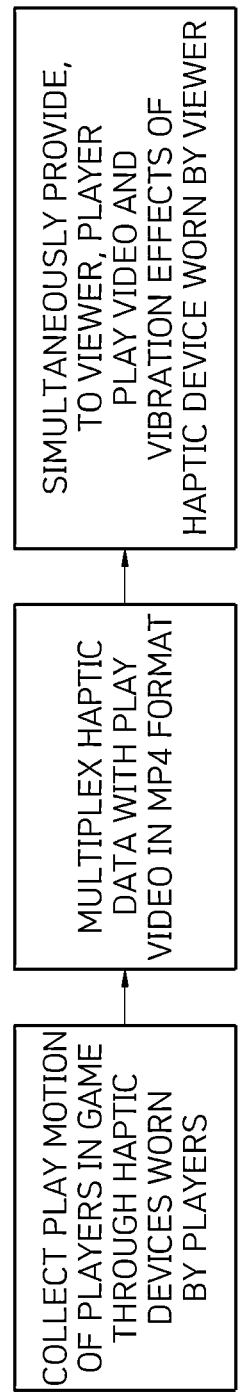
FIG. 1 is a diagram schematically illustrating an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. Further, in order to clearly illustrate the present invention, parts not related to the description are omitted in the drawings.

Furthermore, when a part is referred herein to as "including" elements, it should be understood that it can include only those elements, or other elements as well as those elements, unless specifically described otherwise.

FIG. 1 is a diagram illustrating the technical spirit of the present invention.

A real-time immersive content provision system 1 and a haptic effect transmission method thereof according to an embodiment of the present invention can provide a sense of immersion to viewers by collecting motion of a user who participates in participatory content such as a game through a haptic device (user terminal), multiplexing the motion in a specific format through a streaming mixer as a method of providing an actual play video simultaneously with the motion for broadcast relay, and then simultaneously providing the user's real play video and a haptic response of a haptic device worn by the user in a participatory content video to a client terminal 300.

Also, according to an embodiment of the present invention, it is possible to provide, in real time, media content and haptic content, which range from large-capacity high-quality content to low-quality content, to the client terminal 300.

Meanwhile, among the terms used in the specification of the present invention, the term "user terminal 100" refers to a haptic device capable of collecting haptic information (including movement direction/speed, the amount of hitting, the amount of being hit, the amount of collision, etc.) corresponding to the movement or motion of a user (a game player, etc.) or a force (hitting or shooting by a game opponent, wind, or the like) applied to a user. For example, the user terminal 100 is a terminal that is used or worn by a user who is a game player or other general player who plays e-sports. The user terminal 100 may have various forms and may be configured by adding a haptic device to a tool used for a game (e.g., a gun used in a shooting game) or by including only a haptic device as a separate terminal for body attachment (e.g., a band-type terminal). The user terminal 100 includes a display device as necessary.

The client terminal 300 is meant to include all devices held or worn by a user in contact with the user's body and transmit a haptic response, such as a typical mobile communication terminal, a smartphone, a tablet PC, a personal digital assistant (PDA), a portable multimedia player (PMP), a digital camera, a portable game console, an MP3 player, a remote controller connected to a smart TV in a wire or wireless manner, a mouse connected to a personal computer or a notebook computer in a wire or wireless manner, a video game console, a stick, or other body-worn devices.

Also, among the terms used in the specification of the present invention, the term "content" refers to video data in which a person visually recognizes a moving object or person as a continuous video by capturing the object or person using imaging equipment and then continuously replaying multiple frames at a high speed and refers to video data that is the basis for gathering the movement, speed, shaking, action intensity, and emotional expression of objects and people to form one story and generating haptic effect data which will be described below. And, the term "file" refers to a file that is obtained by digitalizing the video data and that can be stored, read, and reproduced, and files have formats such as MPEG, MOV, RealVideo, AVI, FLV, and MKV.

Next, among the terms used in the specification of the present invention, the term "motion information" refers to data that is generated based on the movement, speed, shaking, action intensity, emotional expression, etc. of objects and people of video content to provide various vibration patterns to users of terminal devices and refers to data that can drive a vibration element capable of converting electrical energy into mechanical energy in the form of vibration to provide various vibration patterns reflecting the vibrancy and excitement of video content to users of terminal devices over time.

Figure 2:
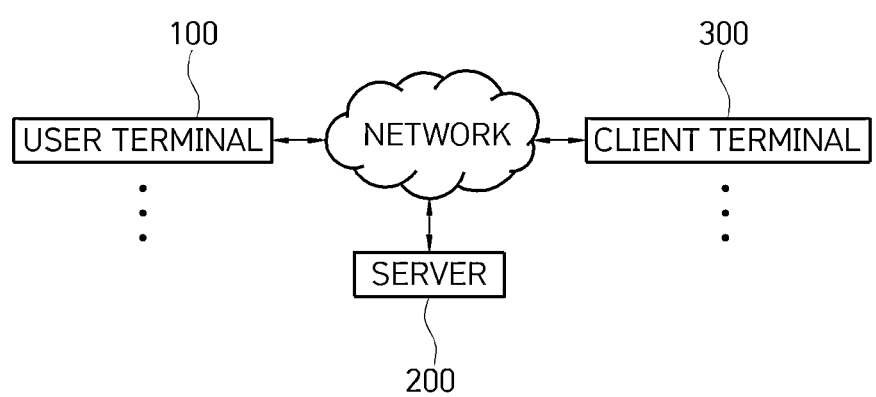
FIG. 2 is a diagram illustrating a real-time immersive content provision system according to an embodiment of the present invention.
Figure 3:
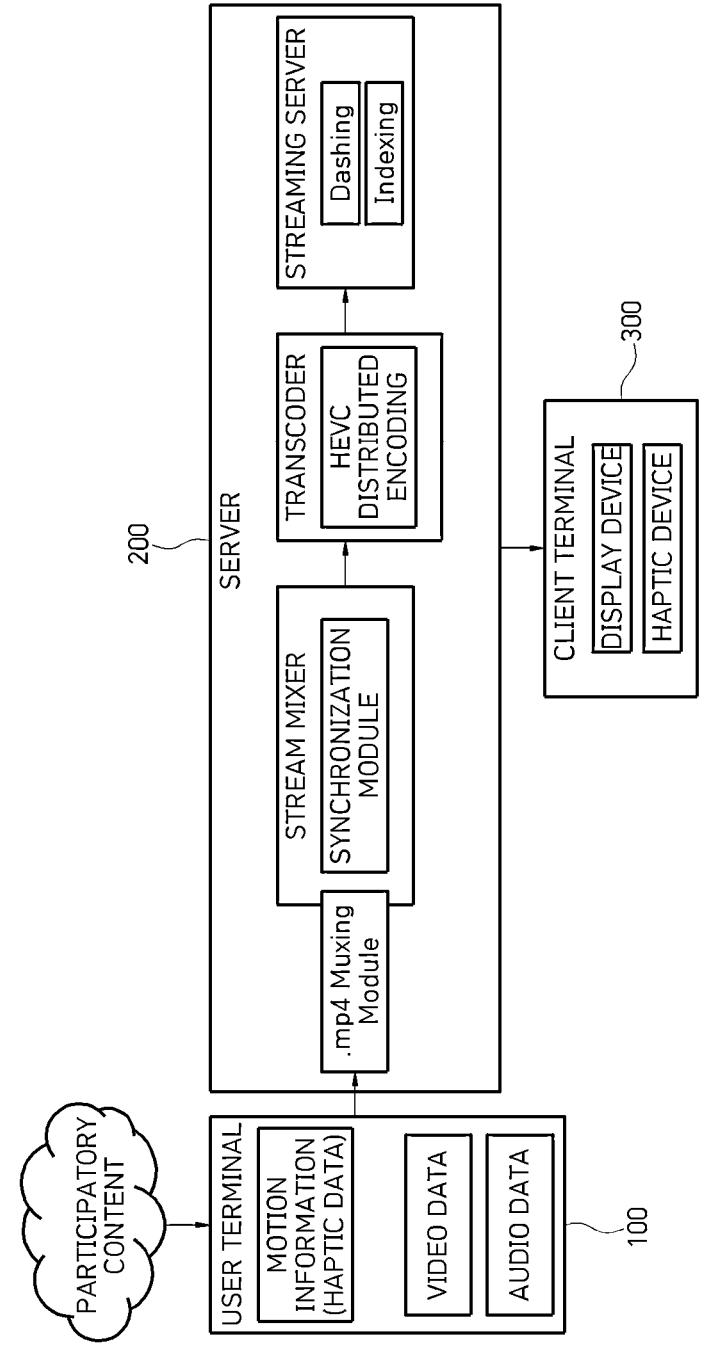
FIG. 3 is a block diagram of a real-time immersive content provision system.
Figure 4:
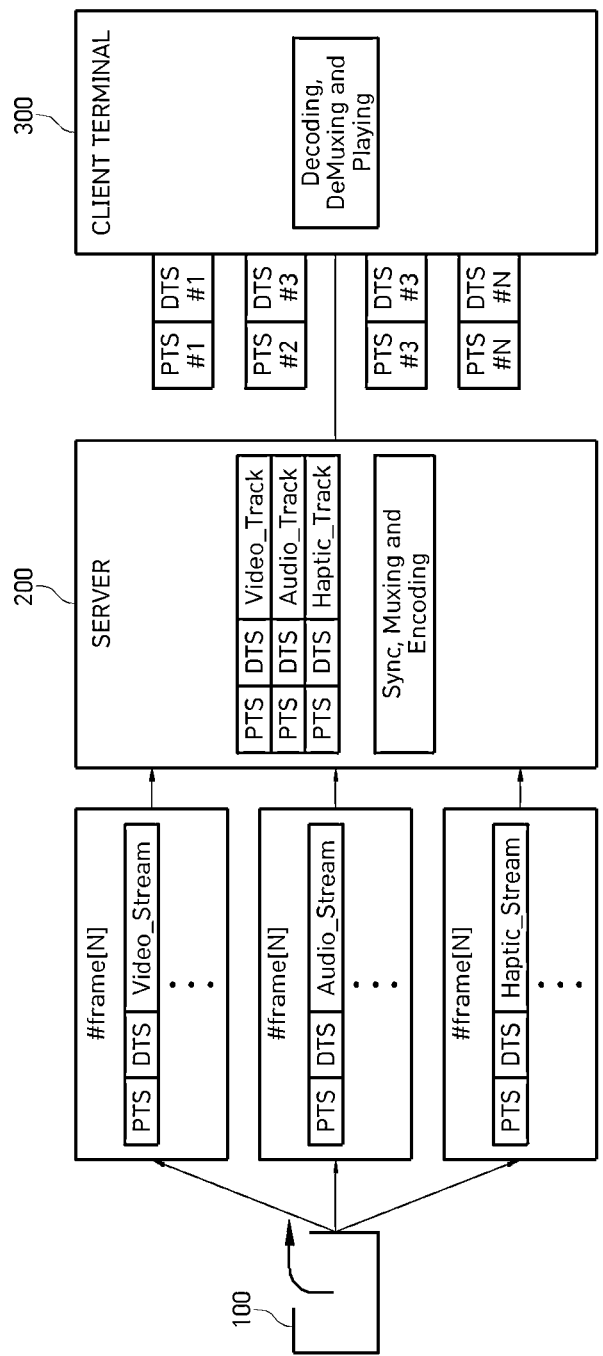
FIG. 4 is a diagram illustrating a process for multiplexing and demultiplexing.

FIG. 2 is a diagram illustrating a real-time immersive content provision system 1 according to an embodiment of the present invention. FIG. 3 is a block diagram of the real-time immersive content provision system 1. FIG. 4 is a diagram illustrating a process for multiplexing and demultiplexing.

The real-time immersive content provision system 1 according to an embodiment of the present invention includes a user terminal 100, a server 200, and a client terminal 300.

The user terminal 100 collects a user's movement or impact or vibration received by a user, the movement, impact, or vibration being generated during the execution of and the participation in participatory content through a haptic device. Motion information is generated based on this. The motion information may be generated by the user terminal 100 or a separate computing device that receives information on the movement, impact, and/or vibration collected by the user terminal 100.

In an embodiment of the present invention, motion information is generated based on the movement, speed, shaking, action intensity, and emotional expression of objects and people of the participatory content. As an example, the motion information may be a haptic response corresponding to an event such as a user hitting or colliding in the participatory content.

Also, in an embodiment of the present invention, the participatory content is content that is executed by a program having a specific purpose and may correspond to, for example, a game.

Meanwhile, the participatory content may include various types of multimedia content such as movies, animations, and music videos as well as the above-described game content.

When motion information is generated from movies, animations, music videos, or the like, unlike game content, it is desirable to analyze video, sound, and audio of produced multimedia content to determine performers' movements, hitting, being hit, action intensity, speed, emotions, and the like and generate motion information for each performer on the basis of this determination because it is difficult to collect the motion information from the user terminal 100. Alternatively, the motion information may be generated by an actor wearing the user terminal 100 when shooting a movie or a music video.

As described above, in the present invention, the motion information may be generated from the user's movement, hitting, being hit, and action intensity, speed collected from the user terminal (the terminal of the game performer or actor) in the game content or may be generated through the analysis of multimedia content.

However, in the following description, participatory content such as game content will be mainly described for convenience of description and enhancement of understanding. However, it will be appreciated that the technical spirit of the present invention is not limited to the following embodiments and may encompass any content, such as multimedia content, from which motion information can be generated and which enables users to feel tactile sensation in addition to motion information.

The server 200 multiplexes video and audio files of participatory content received from the user terminal 100 with motion information collected by and received from a haptic device to obtain a multiplexed file and provides the multiplexed file to the client terminal 300. For example, the server 200 performs multiplexing in ".mp4" type format, as shown in FIG. 4.

In this case, the server 200 may synchronize and encode the video and audio files and the motion information of the multiplexed file and then provide the multiplexed file to the client terminal 300.

For example, as shown in FIGS. 3 and 4, the server 200 may synchronize the video and audio files and the motion information through a stream mixer. In this case, the stream mixer may perform synchronization on the basis of presentation time stamps (PTS) and decoding time stamps (DTS) of a haptic file and the video and audio files. If the video and audio files have no PTS and DTS, the PTS and DTS are added to the video and audio files before the synchronization.

Also, the server 200 may perform HEVC-based distributed encoding on the synchronized multiplexed file through a transcoder.

One or more client terminals 300 may be provided as terminals of viewers who watch e-sports and each of the client terminals 300 includes a display device and a haptic device.

By providing the multiplexed file to the client terminal 300, the server 200 may enable the client terminal 300 to demultiplex the multiplexed file and output the video and audio to the display device and output the motion information to the haptic device. In this case, the client terminal 300 may synchronize the video, audio, and motion information on the basis of the synchronized PTS and DTS and output the synchronized video, audio, and motion information to the display device and the haptic device. The haptic device of the client terminal 300 provides synchronized vibration so that a player can feel the movement direction/speed, the amount of hitting, the amount of being hit, and the amount of colliding in a game according to the haptic information synchronized with the video.

Accordingly, a viewer can experience a haptic response corresponding to a specific event in the same way as a user in addition to video and audio that the user exhibits during actual play.

Meanwhile, in an embodiment of the present invention, when there are a plurality of user terminals 100, the client terminal 300 may select one of a plurality of users.

Accordingly, the client terminal 300 may receive haptic information multiplexed with video and audio files corresponding to the selected user and experience real-time immersive content.

For reference, the elements shown in FIGS. 1 to 4 according to embodiments of the present invention may be implemented as software or hardware such as a field-programmable gate array (FPGA) or an application-specific integrated circuit (ASIC) and may perform predetermined roles.

However, the elements are not limited to the software or hardware and may be configured to be in an addressable storage medium or configured to activate one or more processors.

Accordingly, as an example, the elements include elements such as software elements, object-oriented software elements, class elements, and task elements, processes, functions, attributes, procedures, subroutines, program code segments, drivers, firmware, microcode, circuits, data, database, data structures, tables, arrays, and variables.

Elements and functions provided by corresponding elements may be combined into a smaller number of elements or may be divided into additional elements.

Figure 5:
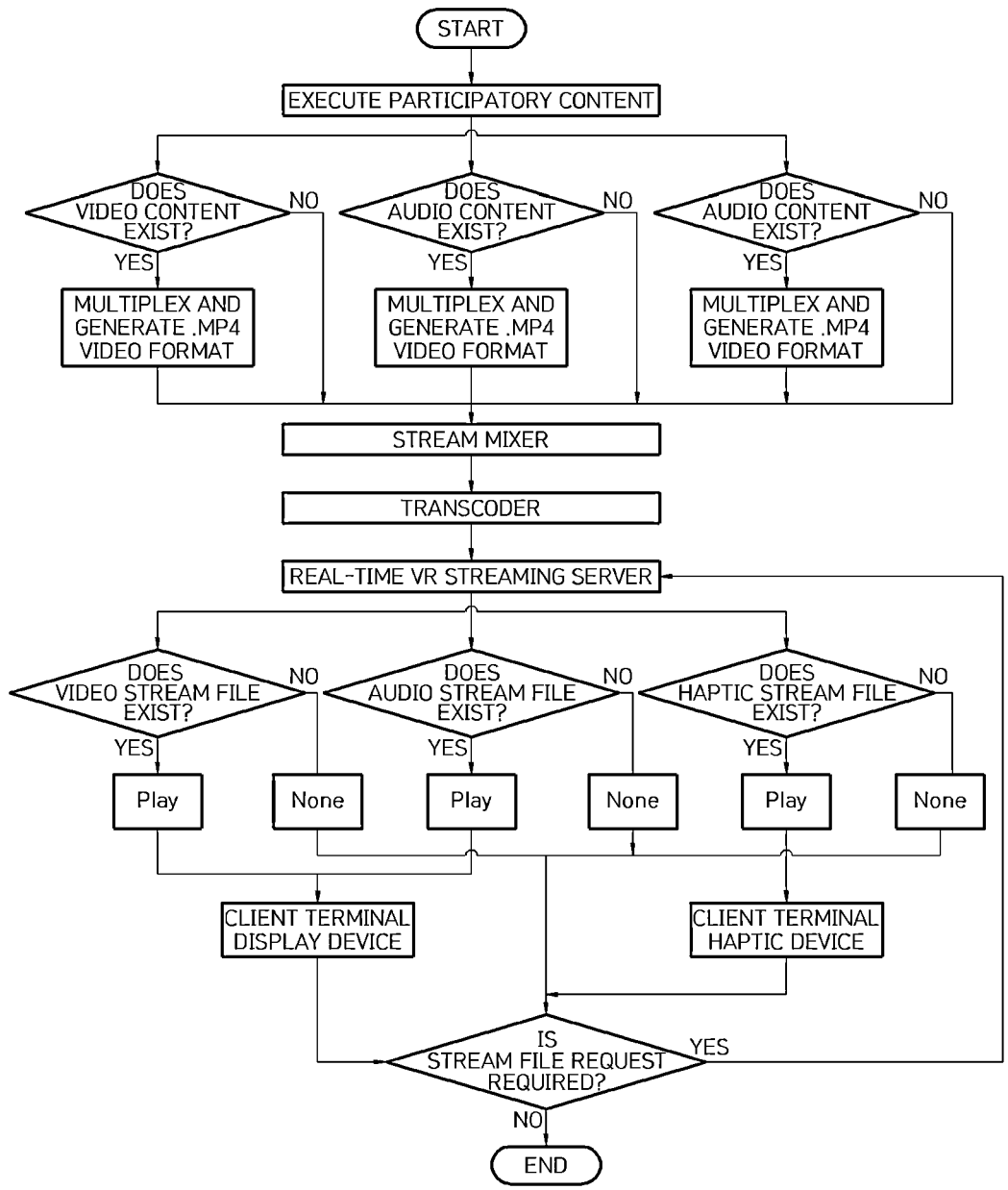
FIG. 5 is a flowchart of a haptic effect transmission method according to an embodiment of the present invention.

FIG. 5 is a flowchart of a haptic effect transmission method according to an embodiment of the present invention.

First, the haptic effect transmission method for providing real-time immersive content according to an embodiment of the present invention executes participatory content in which one or more users participate.

In this case, an embodiment of the present invention may determine whether each of image content, audio content, and haptic content exists and may perform an operation of multiplexing the pieces of content when all of the pieces of content exist. Through this process, for example, the video content may be generated in ".mp4 video" format, the audio content may be generated in ".mp4 audio" format, and the haptic content may be generated in ".mp4 haptic" format.

Next, the stream mixer performs mixing on the video content, the audio content, and the haptic content, and the transcoder encodes the mixture data.

Subsequently, a streaming server determines whether each of a video stream file, an audio stream file, and a haptic stream file exists and allows the files to be output through the display device and the haptic device of the client terminal 300 when the determination result is that all of the files exist.

In this process, the client terminal 300 may synchronize the video stream file, the audio stream file, and the haptic stream file using synchronization information in the server 200 and output the synchronized files.

According to an embodiment of the present invention, when only some of the video stream file, the audio stream file, and the haptic stream file exist, the streaming server may allow only the existing stream files to be output through the display device and/or the haptic device.

Finally, when an additional request for a stream file is required, the stream file is received from the streaming server and the above-described process is repeated. When no additional request is required, the output of the corresponding content is terminated.

Meanwhile, an embodiment of the present invention may be implemented as a computer program stored in a computer-executable medium or a recording medium including computer-executable instructions. A computer-readable medium may be any available medium accessible by a computer and may include volatile and non-volatile media and discrete and integrated media. Also, a computer-readable medium may include both a computer storage medium and a communication medium. The computer storage medium includes volatile and non-volatile media and discrete and integrated media which are implemented in any method or technique for storing information such as computer-readable instructions, data structures, program modules, or other data. Typically, the communication medium includes computer readable instructions, data structures, program modules, or other data of a modulated data signal such as a carrier or other transmission mechanisms and further includes any information transmission medium.

While the method and system of the present invention are described with reference to specific embodiments, some or all of their elements or operations may be implemented using a computer system having a general-purpose hardware architecture.

The above description of the present invention is merely illustrative, and those skilled in the art should understand that various changes in form and details may be made therein without departing from the technical spirit or essential features of the invention. Therefore, the above embodiments are to be regarded as illustrative rather than restrictive. For example, each element described as a single element may be implemented in a distributed manner, and similarly, elements described as being distributed may also be implemented in a combined manner.

The scope of the present invention is shown by the following claims rather than the foregoing detailed description, and all changes or modifications derived from the meaning and scope of the claims and their equivalents should be construed as being included in the scope of the present invention.

INDUSTRIAL APPLICABILITY

The present invention can greatly contribute to the expansion of related industries by increasing the immersion of multimedia content.

The invention claimed is:

1. A haptic effect transmission method for providing real-time immersive game content, the haptic effect transmission method comprising:
    executing real-time immersive participatory game content in which a plurality of game player users participate through a plurality of user terminals and a plurality of viewers participate through a plurality of client terminals, wherein the plurality of user terminals communicate data with the plurality of client terminals;
    collecting motion information of each of the plurality of game player users participating in the real-time immersive participatory game content through a haptic device of a corresponding one of the plurality of user terminals, the motion information comprising a haptic response of the haptic device worn by a corresponding game player user;
    multiplexing a haptic file containing the motion information with video and audio files of the real-time immersive participatory game content to obtain a multiplexed file, wherein the multiplexing comprises synchronizing the video and audio files and the motion information of the haptic file based on presentation time stamps and decoding time stamps of the haptic file and the video and audio files; and
    in response to selection of a first game player user of the plurality of game player users from a first client terminal of the plurality of client terminals, sending the multiplexed file of the first game player user participating the real-time immersive participatory game content to the first client terminal to enable the first client terminal to perform demultiplexing the multiplexed file of the first game player user and simultaneously provide demultiplexed video and audio to a display device of the first client terminal and demultiplexed motion information of the first game player user to a haptic device of the first client terminal in real time such that the video and audio files and the haptic response are simultaneously provided to the first client terminal,
    wherein the demultiplexing comprises:
        synchronizing the demultiplexed video, audio and motion information based on the presentation time stamps and the decoding time stamps, and
        outputting the synchronized video and audio to the display device and the synchronized motion information to the haptic device of the first client terminal worn by a first viewer of the plurality of viewers.

2. The haptic effect transmission method of claim 1, wherein the motion information is generated based on movements, speeds, shaking, action intensity, and emotional expressions of objects and people of the real-time immersive participatory game content.

3. A real-time immersive content provision system for transmitting a haptic effect, the real-time immersive content provision system comprising:
    a plurality of user terminals each including a display device on which real-time immersive participatory game content is executed and a haptic device which is configured to collect motion information of a corresponding one of a plurality of game player users participating in the real-time immersive participatory game content, the plurality of user terminals configured to communicate data with a plurality of client terminals of a plurality of viewers participating in the real-time immersive participatory game content, the motion information comprising a haptic response of the haptic device worn by a corresponding game player user; and
    a server configured to multiplex a haptic file containing the motion information of each game player user with video and audio files of the real-time immersive participatory game content received from the plurality of user terminals to obtain a multiplexed file, the server being further configured to synchronize the video and audio files and the motion information of the haptic file based on presentation time stamps and decoding time stamps of the haptic file and the video and audio files to obtain the multiplexed file,
    wherein in response to selection of a first game player user of the plurality of game player users from a first client terminal of the plurality of client terminals, the server is configured to send the multiplexed file of the first game player user participating the real-time immersive participatory game content to the first client terminal to enable the first client terminal to demultiplex the multiplexed file of the first game player user and simultaneously provide demultiplexed video and audio to a display device of the first client terminal and demultiplexed motion information of the first game player user to a haptic device of the first client terminal in real time such that the video and audio files and the haptic response are simultaneously provided to the first client terminal, and
    wherein the first client terminal is configured to:

synchronize the demultiplexed video, audio and motion information based on the presentation time stamps and the decoding time stamps, and output the synchronized video and audio to the display device and the synchronized motion information to the haptic device of the first client terminal worn by a first viewer of the plurality of viewers.

4. The real-time immersive content provision system of claim 3, wherein the motion information is configured to be generated based on movements, speeds, shaking, action intensity, and emotional expressions of objects and people of the real-time immersive participatory game content.

* * * * *